United States Patent [19]

Waniczek et al.

[11] Patent Number: 4,533,728
[45] Date of Patent: Aug. 6, 1985

[54] PROCESS FOR THE PRODUCTION OF HIGH MOLECULAR WEIGHT POLYESTER CARBONATES

[75] Inventors: Helmut Waniczek, Cologne; Walter Uerdingen; Karola Brudermanns, both of Leverkusen, all of Fed. Rep. of Germany

[73] Assignee: Bayer Aktiengesellschaft, Leverkusen, Fed. Rep. of Germany

[21] Appl. No.: 619,487

[22] Filed: Jun. 11, 1984

[30] Foreign Application Priority Data

Jun. 23, 1983 [DE] Fed. Rep. of Germany ....... 3322667

[51] Int. Cl.$^3$ .............................................. C08G 63/62

[52] U.S. Cl. .................................... 528/370; 528/272; 528/274; 528/301; 528/371

[58] Field of Search ............... 528/370, 371, 272, 274, 528/301

[56] References Cited

U.S. PATENT DOCUMENTS 4,192,940  3/1980  Lindner et al. ..................... 528/370

Primary Examiner—Harold D. Anderson
Attorney, Agent, or Firm—Connolly and Hutz

[57] ABSTRACT

Non-aromatic polyester carbonates which have a high molecular weight are obtained if polycondensation is stopped in a reversible manner by the addition of phenol, the phenol is subsequently removed and polycondensation is continued.

6 Claims, No Drawings

PROCESS FOR THE PRODUCTION OF HIGH MOLECULAR WEIGHT POLYESTER CARBONATES

The present invention relates to a process for the production of high molecular weight polyester carbonates which are based on non-aromatic dicarboxylic acids and non-aromatic diols, which process may be stopped in a reversible manner when a desired degree of condensation has been reached and subsequently continued.

High molecular weight polyester carbonates composed of non-aromatic dicarboxylic acids and non-aromatic diols are known (DE-OS 2,651,639, 2,732,718). They are valuable components for plastics alloys (EP-PS 5736).

The synthesis of high molecular weight polyester carbonates may be carried out, according to the literature, by polycondensing polyester and optionally polyether diols with diphenyl carbonate at an elevated temperature. Rubber-like products are produced but they are so incapable of flowing at temperatures below 200° C. that they can only be removed with difficulty, if at all, from the appropriate reaction containers and they tend to cross-link at temperatures above 200° C. This has hitherto made industrial production of the product unappealing.

It has surprisingly now been found that it is possible to stop polycondensation in a reversible manner so that the product may be removed from the reaction container and may then be subsequently condensed, for example in an extruder.

The present invention thus provides a process for the production of non-aromatic polyester carbonates which have a intrinsic viscosity of from 0.9 to 2.5 dl/g (measured on a solution in tetrahydrofuran at 25° C.), from (a) polyesterdiol having an average molecular weight $\overline{M}_n$ of from 800 to 3,500, optionally (b) polyetherdiol having an average molecular weight $\overline{M}_n$ of from 250 to 3,500 and (c) diarylcarbonate, characterised in that in a first stage (a) from 30 to 100%, by weight, based on the sum of a+b, of polyesterdiol,
(b) from 70 to 0%, by weight, based on the sum of a+b, of polyetherdiol and
(c) from 0.95 to 1.2 moles of diarylcarbonate per mol of (a+b) are heated in the presence of
(d) from 50 to 500 ppm, based on the sum of a+b+c, of a transesterification catalyst at 100° to 200° C. and under a pressure of less than 140 mbars while the resulting hydroxyl compounds and optionally the excess of (c) are removed, until the reaction product has a intrinsic viscosity of from 0.6 to 1.1 dl/g; from 0.1 to 10, preferably from 0.2 to 5%, by weight, based on the sum of a+b+c, of optionally substituted phenol e is added; and component e is removed in a second stage at 100° to 200° C. and under a pressure of from 3 to 260, preferably from 5 to 150 mbars, and the temperature and pressure are maintained within this range until the intrinsic viscosity of the reaction product increases by at least 0.1 dl/g and reaches a value of at least 0.9 dl/g.

By adding optionally substituted phenol e, polycondensation is brought to a standstill, but may be continued after the phenol has been removed. This is particularly surprising, since transesterifications of phenols with non-aromatic carboxylic acid esters are unknown and thus no shift of the chemical balance could be expected on account of the addition of phenol.

The attempt which was made not to completely separate the phenol at first was unsuccessful because the reaction time was prolonged so much that cross-linked products were obtained.

Preferred polyester diols (a) are the reaction products of $C_2-C_{12}$ dicarboxylic acids and $C_2-C_{12}$ diols. Particularly preferred dicarboxylic acids are acyclic. The following are examples of preferred dicarboxylic acids: oxalic acid, malonic acid, succinic acid, glutaric acid, adipic acid, suberic acid, azelaic acid, sebacic acid and hexahydrophthalic acid. Of course the dicarboxylic acids may be used, as far as possible, in the form of the reactive derivatives thereof, for example as anhydrides, for the production of polyester diols. Examples of preferred diols for the production of the polyester diols (a) include diols which are free of ether groups and ether diols which have molecular weights $M_n$ of below 250, such as ethylene glycol, propanediol-1,2 and -1,3, butanediol-1,4 and -2,3, neopentyl glycol, hexanediol-1,6, octane diol-1,8, 1,4-bis-(hydroxymethyl) cyclohexane, 2-methylpropanediol-1,3, di-, tri- and tetraethylene glycol, dipropylene glycol and dibutylene glycol. The polyesterdiols (a) have end hydroxyl groups.

The following are examples of preferred polyetherdiols (b): polyethylene oxide glycols, poly-(propylene oxide-1,2)-glycols, poly-(propylene oxide-1,3)-glycols, poly-(butylene oxide-1,2)-glycols, poly-(butylene oxide-1,4) -glycols, poly-(pentylene oxide-1,2)-glycols, poly-(hexamethylene oxide-1,6)-glycols, poly-(heptamethylene oxide-1,7)-glycols, poly-(octamethylene oxide-1,8)-glycols, poly-(nonamethylene oxide-1,9)-glycols and the addition compounds of ethylene oxide and propylene oxide, optionally in block mixed form.

The average molecular weight $\overline{M}_n$ of the polyesterdiols (a) and the polyetherdiols (b) is determined using a vapour pressure osmometer in tetrahydrofuran.

Preferred diarylcarbonates (c) correspond to the formula

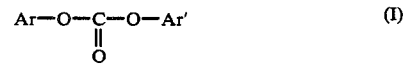

$$Ar-O-\underset{\underset{O}{\|}}{C}-O-Ar' \qquad (I)$$

wherein Ar and Ar' are the same or different and represent $C_6-C_{18}$ aryl radicals, these aryl radicals optionally being substituted by from 1 to 2 $C_1-C_4$ alkyl radicals, nitro groups or halogen atoms (preferably chlorine or bromine), for example alkyl-substituted diphenylcarbonates such as bis-chlorophenyl carbonate, dinaphthyl carbonate, and the alkyl- and halogen-substituted derivatives thereof; asymmetrical diarylcarbonates such as phenyl-tolyl-carbonate, phenyl-chlorophenyl-carbonate, 2-tolyl-4-tolyl-carbonate and 4-tolyl-4-chlorophenyl-carbonate. The diarylcarbonate (c) which is most preferred is diphenyl carbonate.

Preferred transesterification catalysts (d) are described, for example, by R. E. Wilfong in J. Polym. Sci. 54, 385 (1961). The following are examples of preferred catalysts (d): alkali and alkaline earth metal alcoholates and phenolates, tertiary amines such as triethylene diamine and triethylamine, pyridine, secondary amines such as morpholine and pyrrolidone, metal oxides such as antimony trioxide, metal halides such as zinc chloride, titanium tetrachloride and carboxylic esters of transition metals such as titanium tetrabutylate.

Preferred optionally substituted phenols e correspond to the formula $$Ar-OH \quad (II)$$

wherein Ar is as defined above for Ar in formula (I). "Optionally substituted phenols" within the context of the invention thus also include other hydroxyaryl compounds such as naphthols. The compound which is most preferred is unsubstituted phenol.

The end groups of the polyester carbonates which are produced according to the present invention result because of the quantity ratios of the starting materials, and are thus generally either hydroxyl groups or, preferably, arylcarbonate groups.

The process according to the present invention is preferably carried out in the absence of solvent, but may also be carried out in the presence of inert solvents such as aliphatic or aromatic hydrocarbons.

The first stage of the process, according to the present invention, is advantageously carried out with stirring and the second stage is best carried out in an extruder.

The second stage of the process may be carried out continuously or discontinuously. The residence time under the conditions of the second stage is generally from 3 to 20 minutes, preferably from 5 to 15 minutes.

According to a particular embodiment of the process according to the present invention, polyester diol and diphenylcarbonate in a mol ratio of from 1:1 to 1:1.2 are heated to 150° to 185° C. in the presence of sodium phenolate as a catalyst, until the intrinsic viscosity of the reaction product is from 0.7 to 0.9 dl/g, the resulting volatile reaction products being distilled off under a pressure of from 4 to 65 mbars; then, from 0.3 to 1%, by weight, of phenol, based on the sum of polyesterdiol and diphenylcarbonate, is added under ambient pressure with stirring and the reaction mixture is degassed by means of a three-stage degassing extruder at 170° to 185° C. and 13 to 65 mbars, so that the residence time of the reaction product under these conditions is from 8 to 15 minutes.

The polyester carbonates which are produced, according to the present invention, may be easily subjected to strand granulation and thus assume a form such that they may be very favourably used as additives to plastics materials, such as to PVC.

The parts which are specified in the following Examples are parts by weight and the ratios are ratios by weight.

EXAMPLE 1

24,500 parts of a polyesterdiol produced from adipic acid and a mixture of n-hexane-1,6-diol/neopentyl glycol in a ratio of 66:35, having an average molecular weight $\overline{M}_n$ of 2,000, 2,884 parts of diphenylcarbonate and 6 parts of sodium phenolate are heated to 182° C. over a period of 1.5 hours with stirring, the pressure is lowered to 5 mbars and volatile polycondensation products, which consist for the most part of phenol, are distilled off. The mixture is stirred for a further 3 hours under these reaction conditions, and the reaction container is subsequently flushed with nitrogen. The resulting polyester carbonate has a intrinsic viscosity of 0.9 dl/g.

150 parts of phenol are now added and mixed in under a slight excess pressure of nitrogen. The reaction mixture is maintained at 180° C. and over a period of 3 hours is continuously metered into the inlet opening of a degassing extruder having a shaft length:shaft diameter ratio of L/D=40. The added phenol and the volatile reaction products which have just been produced are distilled off through three evaporation towers at 180° C. and under 30 mbars. The rubber-like polyester carbonate, which may be crushed by a strand granulator, emerges from the nozzle of the extruder. The resulting polyester carbonate has a intrinsic viscosity of 1.52 dl/g.

EXAMPLE 2 (Comparison)

The experiment of Example 1 is repeated with the exception that no phenol is added after the 4½ hour long reaction in the stirring reactor. When the product is being removed from the reactor the viscosity increases so much that after a further hour the reaction product can no longer be conveyed in the reactor; the stirrer is broken after 6 hours.

EXAMPLE 3

12,000 parts of a polyesterdiol, produced from adipic acid and a mixture of n-hexane-1,6-diol/neopentyl glycol in a ratio of 65:35, having an average molecular weight $\overline{M}_n$ of 2,000, 12,000 parts of a polyesterdiol produced from adipic acid and hexanediol-1,6 having an average moelcular weight of $\overline{M}_n$ of 950, 4,380 parts of diphenylcarbonate and 8 parts of sodium phenolate are reacted as in Example 1. The viscosity of the polyester carbonate of the first stage is 0.85 dl/g.

A colourless rubber-like polyester carbonate having a viscosity of 1.1 dl/g is obtained.

EXAMPLE 4

5,000 parts of a polyesterdiol, produced from adipic acid and a mixture of n-hexane-1,6-diol/neopentyl glycol in a ratio of 65:35, having an average molecular weight $\overline{M}_n$ of 1,835, 1,500 parts of a polypropylene oxide diol having an average molecular weight $\overline{M}_n$ of 400, 1,524 parts of diphenylcarbonate and 2.4 parts of sodium phenolate are heated to 150° C. over a period of 1 hour with stirring, the pressure being lowered to 8 mbars and mainly phenol is distilled off. The mixture is subsequently heated to 185° C. over a period of 4 hours and the pressure is lowered to 3 mabrs. A sample which is then drawn off has a intrinsic viscosity of 0.79 dl/g.

A solution of 40 parts of phenol in 3,000 parts of toluene is now pumped into the reactor under ambient pressure. The reaction mixture is degassed in a degassing extruder at 185° C. and under 20 mbars after 20 minutes, so that the residence time in the extruder is 12 minutes.

The rubber-like reaction product has a limit viscosity of 1.22 dl/g.

We claim:

1. A process for the production of non-aromatic polyester carbonate which has an intrinsic viscosity of from 0.9 to 2.5 dl/g, measured in a solution of tetrahydrofuran at 25° C., from (a) polyesterdiol produced from a dicarboxylic acid and a diol having a number average molecular weight $\overline{M}_n$ of from 800 to 3,500, (b) polyetherdiol having a number average molecular weight $\overline{M}_n$ of from 250 to 3,500 and (c) diarylcarbonate, characterized in that in a first stage
   (a) from 30 to 100%, by weight, based on the sum of a+b, of polyesterdiol,
   (b) from 70 to 0%, by weight, based on the sum of a+b, of polyetherdiol and (c) from 0.95 to 1.2 moles of diarylcarbonate per mol of (a+b) are heated in contact with (d) from 50 to 500 ppm, based on the sum of a+b+c, of a transesterification catalyst at 100° to 200° C. under a pressure of less than 140 mbars while the resulting hydroxyl compounds are removed, until the reaction product has an intrinsic viscosity of from 0.6 to 1.1 dl/g; from 0.1 to 10%, by weight, based on the sum of a+b+c, of phenol (e) is added; and component (e) is removed in a second stage at from 100° to 200° C. and under a pressure of from 3 to 260 mbars, and the temperature and pressure are maintained within these limits until the intrinsic viscosity of the reaction product increases by at least 0.1 dl/g and reaches a value of at least 0.9 dl/g.

2. A process according to claim 1, characterised in that, in the first stage, from 0.2 to 5%, by weight, based on the sum of a+b+c, of phenol (e) are added.

3. A process according to claim 2 wherein the pressure in the second stage is from 5 to 150 mbars.

4. A process according to claim 1 wherein the pressure in the second stage is from 5 to 150 mbars.

5. A process according to claim 1 wherein components (a), (b), (c) and (d) are heated at 100° to 200° C. under a pressure of less than 140 mbars while the resulting hydroxyl compounds and excess component (c) are removed.

6. A process according to claim 1 wherein phenol component (e) is a substituted phenol.

* * * * *